(12) United States Patent
Maharia (10) Patent No.: US 11,070,472 B1
(45) Date of Patent: Jul. 20, 2021

(54) DYNAMICALLY MAPPING HASH INDICES TO MEMBER INTERFACES

(71) Applicant: Juniper Networks, Inc., Sunnyvale, CA (US)

(72) Inventor: Rashmi Maharia, Sikar (IN)

(73) Assignee: Juniper Networks, Inc., Sunnyvale, CA (US)

(*) Notice: Subject to any disclaimer, the term of this patent is extended or adjusted under 35 U.S.C. 154(b) by 205 days.

(21) Appl. No.: 16/357,521

(22) Filed: Mar. 19, 2019

(51) Int. Cl.
*H04L 12/721* (2013.01)
*H04L 12/709* (2013.01)
*H04L 12/743* (2013.01)
*H04L 29/12* (2006.01)

(52) U.S. Cl.
CPC .......... *H04L 45/7453* (2013.01); *H04L 45/12* (2013.01); *H04L 45/245* (2013.01); *H04L 61/2585* (2013.01)

(58) Field of Classification Search
CPC ... H04L 45/12; H04L 45/245; H04L 61/2585; H04L 45/7453
USPC ................................................. 370/320, 395
See application file for complete search history.

(56) References Cited

U.S. PATENT DOCUMENTS

| 7,898,959 | B1* | 3/2011 | Arad ...................... H04L 45/24 370/235 |
| 8,937,865 | B1* | 1/2015 | Kumar ................... H04L 47/76 370/235 |
| 9,559,985 | B1* | 1/2017 | Ye ........................ H04L 49/1515 |
| 10,880,206 | B2* | 12/2020 | Wei ...................... H04L 47/2441 |
| 2015/0127809 | A1* | 5/2015 | Akella ................ H04L 45/7453 709/224 |

* cited by examiner

*Primary Examiner* — Gbemileke J Onamuti
(74) *Attorney, Agent, or Firm* — Shumaker & Sieffert, P.A.

(57) ABSTRACT

Techniques are described for dynamically mapping hash indices to member interfaces of an aggregated interface in a hash data structure. As one example, a network device may compute net weights for the member links of a link aggregation group (LAG) and respective utilization values of hash indices in a hash map for the LAG. The network device may generate binary trees based on the net weights and utilization values of the member links of the LAG, and may map values, e.g., median values, of one or more nodes of the binary trees to member interfaces, and update the hash data structure based on the mapping.

20 Claims, 7 Drawing Sheets

| HASH DATA STRUCTURE 300 |||||
| --- | --- | --- | --- | --- |
| HASH INDEX 302 | PREVIOUS LINK MAP 304 | UTILIZATION (U) 306 | NORMALIZED UTILIZATION (U') 308 | NEW LINK MAP 310 |
| 1 | 18C | 312265756 | 3 | 18A |
| 2 | 18B | 20167312 | 2 | 18A |
| 3 | 18C | 79898743 | 8 | 18C |
| 4 | 18A | 50012128 | 5 | 18C |
| 5 | 18B | 9879874 | 1 | 18A |
| 6 | 18C | 30234118 | 3 | 18B |
| 7 | 18C | 59987888 | 6 | 18C |
| 8 | 18A | 40112164 | 4 | 18B |
| 9 | 18C | 19678917 | 2 | 18A |
| 10 | 18C | 40012365 | 4 | 18C |
| 11 | 18B | 28998194 | 3 | 18B |
| 12 | 18C | 38998829 | 4 | 18B |
| 13 | 18C | 20011248 | 2 | 18A |
| 14 | 18B | 50011265 | 5 | 18B |
| 15 | 18C | 27896595 | 3 | 18C |
| 16 | 18A | 50102017 | 5 | 18C |

For Hash-table H with M indices and Aggregate interface A with N members:
H = {H$_1$, H$_2$, H$_3$, ..., H$_M$}
A = {L$_1$, L$_2$, L$_3$, ..., L$_N$}

1. Net weight for member link L$_i$:
   a. W$_i$ = s$_i$*w$_i$
      where {s$_i$ : Speed of Member link L$_i$ , w$_i$ : Weight of Member link L$_i$}
   b. W' = Normalized {W$_i$} ; where {∃ i ≤ N : W$_i$ is not-utilized}

2. Hash indices norm-utilization in time window T:
   a. U$_T$ = {U$_{1T}$, U$_{2T}$, U$_{3T}$, ..., U$_{MT}$} ; where {U$_{jT}$ : Utilization of hash-index H$_j$ in time T}
   b. U$_T$' = Normalized {U$_T$}

3. while(U$_T$')
   a. Calculate Medians for U$_T$' and W', based on their respective cardinality $$U'_{Med-T} = \frac{\sum_{i=1}^{i=|U'|} U_{iT}'}{|U'|} \quad ; \quad W'_{Med} = \frac{\sum_{i=1}^{i=|W'|} W_i'}{|W'|}$$

b. Get median trees:
      i. MT-W' = BST for W', with root : rounded(W'$_{Med}$) ∈ W'
      ii. MT-U$_T$' = BT for U$_T$', with root : rounded(U'$_{Med-T}$) ∈ U$_T$'
      iii. Expand MT-U$_T$' to match MT-W'.
           Borrow median values from root if required child nodes are empty.
   c. Map root(MT- U$_T$') to root (MT- W')
   d. Repeat above 3 steps (3.a-3.c) for left and right sub-trees for all levels:
      i. Left(MT-U$_T$') and Left(MT-W') => Map left sub-tree
      ii. Right(MT-U$_T$') and Right(MT-W') => Map right sub-tree
   e. If (over-utilized or under-utilized node in MT-W', based on tolerance factor)
      i. If Right(MT-W') under-utilized => Left-rotate(MT-W')
      ii. If Right(MT-W') over-utilized => Skip right allocation in next iteration
      iii. Do 3.e for all levels
   f. Adjust the sets:
      i. U$_T$' = U$_T$' – {Mapped-values}
      ii. ∀ (W'$_i$ ⊢ W')
         1. If $\frac{\sum \text{Mapped-values}(W'_i)}{\sum U_{iT}} == \frac{W'_i}{\sum W'_i}$
            => Remove W'$_i$ from W'

4. Update hash-index link-map based on above mapping.

DYNAMICALLY MAPPING HASH INDICES TO MEMBER INTERFACES

TECHNICAL FIELD

This disclosure relates to network device and, more particularly, to network devices providing packet forwarding.

BACKGROUND

A computer network is a collection of interconnected network devices that can exchange data and share resources. In a packet-based network, such as an Ethernet network, the network devices communicate data by dividing the data into variable-length blocks called packets, which are individually routed across the network from a source device to a destination device. The destination device extracts the data from the packets and assembles the data into its original form.

A network device may be connected to one or more other network devices via one or more physical links. The term "link" is often used to refer to the connection between two devices on a network. The link may be a physical medium, such as a copper wire, coaxial cable, any of a host of different fiber optic lines, or a wireless connection. In some cases, two or more links may be logically grouped or aggregated together to form an "aggregated bundle" and the interfaces for the links aggregated in this way form an "aggregated interface." For example, a network device may be connected to one or more other network devices via an aggregated bundle of multiple physical links. In some cases, Ethernet links may be combined into one logical interface for higher bandwidth and redundancy. Ports of the Ethernet links that are combined in this manner are referred to as a link aggregation group (LAG), and links aggregated into a LAG are referred to as member links. Link aggregation groups are sometimes alternatively referred to as "bundles" or "trunks."

When sending packets through the LAG, network devices may employ a hashing function to determine an outbound interface with which the network device is to forward the packet. For example, when the network device receives a packet, the network device extracts one or more keys from the packet, which are used to compute a hash value, referred to as "hash index." The network device performs a lookup of the hash index in a hash data structure that generally provides a unique mapping between a set of input values, such as hash indices, and storage locations for corresponding output values, such as corresponding interfaces to member links of the LAG, to determine an outbound interface for which the network device forwards the packet. The network device then outputs packet via the determined outbound interface.

SUMMARY

In general, this disclosure describes techniques for dynamically mapping hash indices to member interfaces of an aggregated interface in a hash data structure. For example, a network device, e.g., a router or switch, may use a link aggregation group (LAG) to forward traffic for multiple flows each having a different traffic profile, such as different rates. In addition, the member links of the LAG may have different characteristics, such as different weights and/or bandwidths. As described herein, the network device may dynamically re-assign hash indices of a hash map among the member links of the LAG by using binary trees to map hash index utilization values to member links.

As one example, the network device may compute net weights for the member links of a LAG and respective utilization values (e.g., byte count, bandwidth, etc.), over a time period, of hash indices in a hash map for the LAG, where a utilization value of a hash index indicates an amount of traffic hashed to the hash index and therefore mapped to the corresponding member interface to which that hash index was assigned during that time period. The network device may generate binary trees based on the net weights and utilization values of the member links of the LAG. The network device may map values, e.g., median values, of one or more nodes of the binary trees to member interfaces, and update the hash data structure based on the mapping.

In some examples, the network device may determine one or more of the member links of the LAG are under-utilized or over-utilized. If the network device determines that the member link is under-utilized, the network device may re-balance the binary trees, e.g., by rotating the binary trees, to increase the utilization of the under-utilized link. If the network device determines that the member link is over-utilized, the network device may, in a next mapping iteration, skip the mapping of the over-utilized link to decrease the utilization of the over-utilized link.

The techniques of this disclosure may provide one or more technical advantages. For example, by using binary trees to program or re-program the hash index to member interface mapping, a network device may re-configure a hash data structure mapping to provide a proportionate dynamic allocation of the member interfaces. In this way, the network device uses the hash data structure to distribute network traffic to member interfaces for transmission in a proportionate manner, thereby reducing the occurrence of traffic being hashed to an over-utilized link and the occurrence of dropped traffic, reducing latency, and improving resource utilization. Additionally, each iteration of generating the binary trees provides regular feedback (e.g., whether links are under-utilized or over-utilized) that helps to achieve a more optimal allocation. Moreover, the techniques described herein may have a reduced computational complexity, e.g., a constant complexity that is a ratio of the number of hash-indices (M) to the number of members (N), e.g., $O(M/N)$, rather than a complexity of $O(N*N)$ of other hash re-distribution techniques.

The details of one or more examples are set forth in the accompanying drawings and the description below. Other features, objects, and advantages will be apparent from the description and drawings, and from the claims.

BRIEF DESCRIPTION OF DRAWINGS

FIG. 5 illustrates an example operation to dynamically map hash indices to member interfaces of an aggregated interface, in accordance with the techniques described in this disclosure.

DETAILED DESCRIPTION

Figure 1:
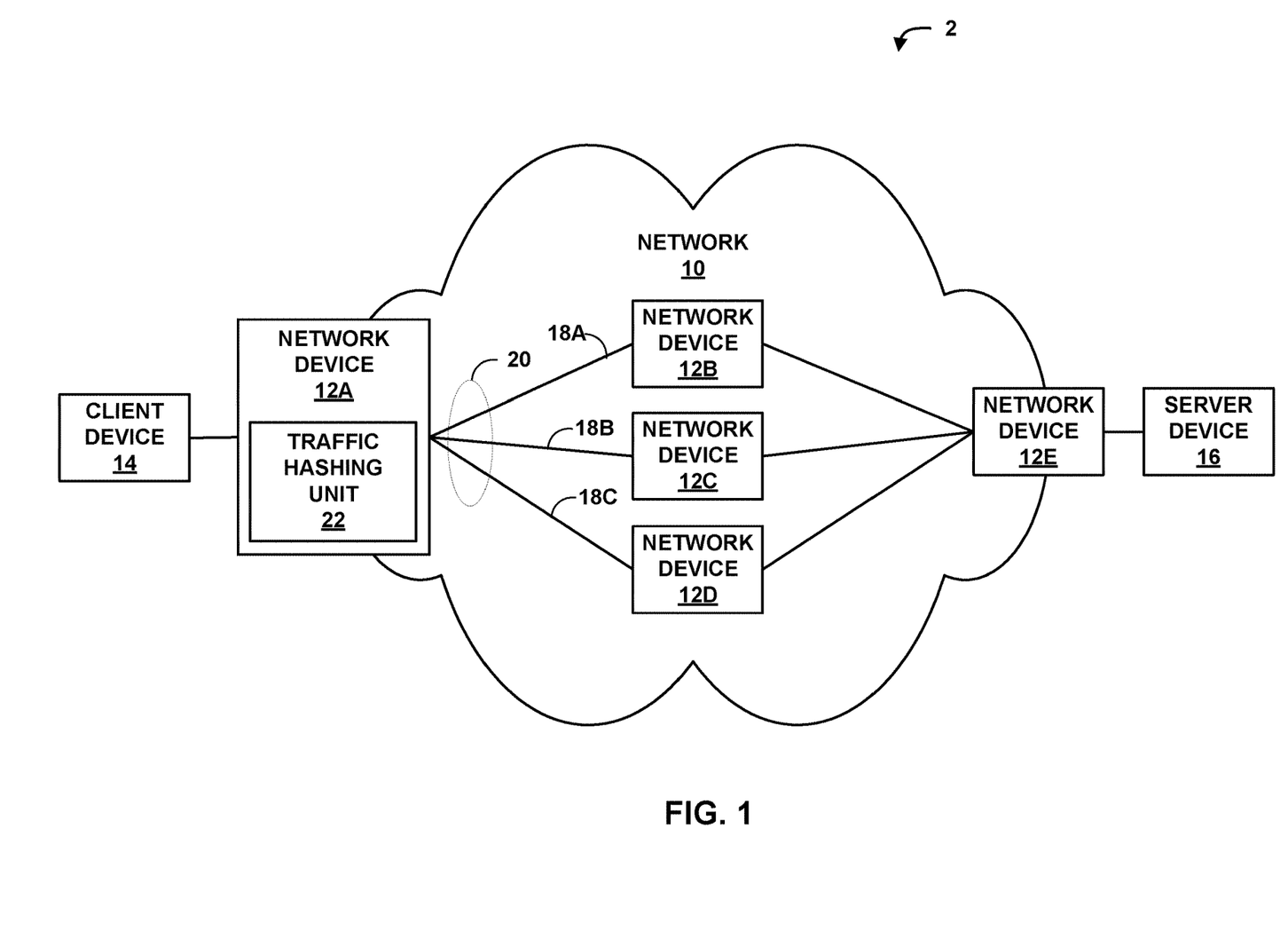
FIG. 1 is a block diagram illustrating an example system including a variety of network devices, any of which may implement hashing techniques as described in this disclosure.

FIG. 1 is a block diagram illustrating an example system 2 including a variety of network devices, any of which may implement hashing techniques as described in this disclosure. The example of FIG. 1 includes client device 14 and server device 16, which communicate via network 10. Network 10 includes network devices 12A-12E (collectively, "network devices 12") to communicate traffic to/from client devices 14 and server device 16. Network devices 12 may include routers, switches, gateways, hubs, security devices, servers, or other devices, any or all of which may implement the hashing techniques of this disclosure.

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as one or more non-edge switches, routers, hubs, gateways, security devices, such as firewalls, intrusion detection, and/or intrusion prevention devices, computer terminals, laptops, tablets, printers, databases, wireless mobile devices such as cellular phones or personal digital assistants, wireless access points, bridges, cable modems, application accelerators, or other network devices. Server device 16 may represent one or more web servers, file servers, peer devices (e.g., another user's computing device), database servers, print servers, or other devices from which a client device requests services.

Client device 14 submits requests to server device 16 via network 10. In particular, in this example, client device 14 is communicatively coupled to network device 12A. In other examples, client device 14 may be communicatively coupled to network device 12A via additional network devices, such as access lines, wireless infrastructure and backhaul networks, and the like. Client device 14, server device 16, and network devices 12 may be connected via communication links. Each of the communication links may be a physical medium, such as a copper wire, a coaxial cable, any of a host of different fiber optic lines, or a wireless connection.

Client device 14 and server device 16 are only example traffic generators and traffic consumers. Network device 12A may forward traffic for thousands of traffic flows originated by any number of devices and destined for any number of devices.

Network devices 12 of network 10 are configured to determine routes through network 10 to reach various destinations, such as server device 16. In general, network devices 12 execute routing protocols to learn the topology of network 10 and to select routes for forwarding traffic along paths according to the routes. For example, network devices 12 implement routing protocols, e.g., an interior gateway protocol (e.g., intermediate system to intermediate system (IS-IS)) or an exterior gateway protocol (e.g., border gateway protocol (BGP)), to determine paths through network 10, as well as to share routes with other network devices 12. In the example of FIG. 1, network device 12A may exchange routing protocols with other network devices and determines that three paths exist to reach server device 16. A first path beginning at network device 12A to reach server device 16 includes network device 12B, network device 12E, and server 16. A second path beginning at network device 12A to reach server device 16 includes network device 12C, network device 12E, and server 16. A third path beginning at network device 12A to reach server device 16 includes network device 12D, network device 12E, and server 16. Upon receiving a network packet destined for server device 16, network device 12A performs a lookup function on keying information within the packet and forwards the data along the selected path.

In some examples, network device 12A stores routing information for known routes in one or more routing tables or other data structures, also referred to as a routing information base (RIB). A control plane of network device 12A generates forwarding information based on the routing tables in the form of one or more forwarding tables or other data structures, also referred to as a forwarding information base (FIB), and programs a data plane in accordance with the forwarding information. The FIB stores network addresses or other keying information (e.g., Multiprotocol Label Switching (MPLS) labels) and maps the keying information with particular logical or physical network interfaces of the network device 12A. Upon receiving a packet of data from client device 14, network device 12A can determine a network interface through which to send the packet based on the keying information of the packet such that the packet ultimately reaches, for example, a destination address specified in the packet.

In some examples, two or more outbound links of network device 12A may be logically grouped or aggregated together to form an "aggregated bundle." For example, ports of network device 12A connected to Ethernet links 18A-18C (collectively, "links 18" or "member links 18") may be aggregated to form link aggregation group (LAG) 20. Links 18 may be combined into one logical, aggregated interface for higher bandwidth and redundancy. While illustrated in FIG. 1 as a multi-chassis LAG in that multiple networks devices 12B-12D terminate member links 18A-18C with network devices 12A, the techniques may apply to LAGs or other aggregated interfaces in which network device is coupled to another network device with multiple links formed into an aggregated interface.

Network device 12A may load-balance traffic across LAG 20. In some examples, network device 12A may employ a local hashing function to load-balance traffic flows onto links 18. Network device 12A may perform a hashing function to determine an interface of the aggregated interface with which network device 12A is to forward the packet. For example, network device 12A may include a hash data structure that provides a unique mapping between a set of input values, such as hash indices, and storage locations for corresponding output values, such as corresponding interfaces to member links 18 that are part of LAG 20 (referred to herein as "member interfaces"). When network device 12A receives a packet from client device 14, network device 12A may extract keying information from the packet, e.g., a 5-tuple of the packet (e.g., source IP address, destination IP address, source port, destination port, and protocol) to compute a hash index from the keying information, perform a lookup of the hash index in the hash data structure to map the hash index to a member interface, and forward the packet via the member interface toward server device 16.

Typically, hash data structures may be configured to evenly distribute traffic across all hash-indices based on rates/bandwidth capabilities of the member links of a LAG. Using these hash data structures, network devices may in some instances distribute traffic flows in an unbalanced manner, thereby over-utilizing or under-utilizing the link. For example, a network device may distribute multiple heavy traffic flows to hash indices that are all mapped to the same member interface, which may cause the corresponding link to become over-utilized. This disproportionate distribution of traffic to the over-utilized link may cause the network device to unnecessarily drop subsequent traffic flows while traffic continues to flow through the over-utilized link. Conventional re-distribution techniques are based on determining byte-count per hash index, which is used to compare utilization of every member link of an N-link LAG with every other member link in the LAG to determine re-distribution. This results in a complexity of O(N*N).

In accordance with techniques described in this disclosure, a network device, e.g., network device 12A, may dynamically map hash indices to member interfaces of a LAG in a hash data structure to provide more proportionate allocation of the member interfaces among the hash indices. For example, network device 12A includes a traffic hashing unit 22 to program or re-program hash indices to member interface mappings using binary trees. More specifically, and as further described below, traffic hashing unit 22 of network device 12A may compute net weights for the member links 18 of LAG 20 and respective utilization values (e.g., byte count, bandwidth, etc.), over a time period, of hash indices in a hash map for the LAG, where a utilization value of a hash index indicates an amount of traffic hashed to the hash index and therefore mapped to the corresponding member interface to which that hash index was assigned during that time period. Traffic hashing unit 22 may generate binary trees based on the net weights and utilization values of the member links of the LAG. The utilization values may be normalized first in some instances. Traffic hashing unit 22 may map values, e.g., median values, of one or more nodes of the binary trees to member interfaces for member links 18, and update the hash data structure based on the mapping.

In the example of FIG. 1, traffic hashing unit 22 may determine the net weight (W') for each of member links 18 of LAG 20. In some examples, traffic hashing unit 22 may determine the net weight for the member links that are under-utilized or over-utilized. To compute the net weight for a member link (i), the speed of the link ($L_i$) is multiplied by the weight ($w_i$) of the member link, as shown below:

$W_i = s_i * w_i$; where $\{s_i$: speed of member link $L_i, w_i$: weight of member link $L_i\}$ In some instances, the computed values may be normalized, as shown below:

$W' = $ Normalized $\{W_i\}$; where $\{\exists i \leq N: W_i$ is not-utilized$\}$ As one example, link 18A may have a speed of 50 Mbps and a weight of 20, link 18B may have a speed of 50 and a weight of 40, and link 18C may have a speed of 100 and a weight of 30. In this example, traffic hashing unit 22 may therefore calculate a net weight (W') of 10 for link 18A, a net weight of 20 for link 18B, and a net weight of 30 for link 18C. As further described below (and as further illustrated in FIG. 4), the net weights of links 18A-18C are used to generate binary trees.

Traffic hashing unit 22 may determine the utilization values ($U_T$) within a specific time period of each mapping of links 18 (e.g., byte count, bandwidth, etc.) and hash indices ($H_j$), as shown below:

$U_T = \{U_{1T}, U_{2T}, U_{3T}, \ldots, U_{MT}\}$; where $\{U_{jT}$: Utilization of hash index $H_j$ in time $T\}$ Traffic hashing unit 22 may normalize the set of utilization values to compute a set of normalized utilization values, such as indicated below:

$U_T' = $ Normalized $\{U_T\}$

Continuing the example above, traffic hashing unit 22 of network device 12A may include a hash data structure (e.g., hash data structure 300 of FIG. 3) that includes hash indices mapped to links 18. Traffic hashing unit 22 may determine a set of utilization values of each mapping of a hash index and one of links 18 and normalize the utilization values to compute a set of normalized utilization values (e.g., as further shown in normalized utilization column 308 of hash data structure 300 of FIG. 3).

Using the set of normalized utilization values and the net weights of links 18, traffic hashing unit 22 may generate binary trees based on their respective cardinality. For example, traffic hashing unit 22 may compute a median for the normalized utilization values ($U'_{Med-T}$), as shown below:

$$U'_{Med-T} = \frac{\sum_{i=1}^{i=|U'|} U_{iT'}}{|U'|}$$

and compute a median for the net weights ($W'_{Med}$), as shown below:

$$W'_{Med} = \frac{\sum_{i=1}^{i=|W'|} W_{i'}}{|W'|}$$

Based on the median values, traffic hashing unit 22 may generate binary trees (otherwise referred to as "median binary trees" or "median trees (MT)"). For example, to generate the binary tree with the net weights, traffic hashing unit 22 may generate a binary tree, and in examples a binary search tree (BST), with the root of the tree as the rounded median value of the net weights, as shown below:

$MT$-$W'$=BST for $W'$, with root: rounded($W'_{Med}$)$\in W'$

Continuing the example above, traffic hashing unit 22 may calculate a net weight (W') of 10 for link 18A, a net weight of 20 for link 18B, and a net weight of 30 for link 18C. In this example, traffic hashing unit 22 may generate a binary tree with the root of the tree as the rounded median value of the net weights, e.g., 20, and configure the left child node as the lower net weight, e.g., 10, and the right child node as the higher net weight, e.g., 30. That is, the root of the binary tree is link 18B having a net weight 20, the left child node of the binary tree is link 18A having a net weight of 10, and the right child node of the binary tree is link 18C having a net weight of 30.

To generate the binary tree with the set of normalized utilization values, traffic hashing unit 22 may match the nodes of the binary tree of the net weights. For example, traffic hashing unit 22 may generate a binary tree (BT) with the root of the tree as the rounded median value of the set of normalized utilization values, as shown below:

$MT\text{-}U_T' = \text{Binary Tree}(BT)$ for $U_T'$, with root:rounded $(U'_{Med\text{-}T}) \in U_T'$ The binary tree of the normalized utilization values may be expanded to match the binary tree of the net weights. For example, if the binary tree of the net weights includes a left child node and a right child node, the traffic hashing unit 22 expands the binary tree of the set of normalized utilization values to include a left child node and a right child node. In some examples in which child nodes of the binary tree are empty, median values from the root of the binary tree may be used for the child nodes.

Traffic hashing unit 22 may map the nodes of the binary trees. For example, traffic hashing unit 22 may map a root of the binary tree for the normalized utilization value to a root of the binary tree for the net weights. Similarly, traffic hashing unit 22 may map the left child nodes of the binary trees and the right child nodes of the binary trees.

In some examples, traffic hashing unit 22 may adjust the allocation of hash indices to under-utilized or over-utilized member links. For example, traffic hashing unit 22 may determine if a member link is under-utilized or over-utilized using a tolerance factor or threshold. For example, the traffic hashing unit 22 may determine that a member link is under-utilized (e.g., exceeding a minimum utilization threshold), then traffic hashing unit 22 may re-balance the binary trees. More specifically, traffic hashing unit 22 may determine that a member link is under-utilized (e.g., exceeding a minimum utilization threshold) and re-balance the binary trees by generating a binary tree that is rotated (e.g., left rotation) to shift the mapping to the under-utilized link. That is, on a next mapping iteration, traffic hashing unit 22 may generate rotated binary trees to increase the utilization of the under-utilized link. Alternatively, or additionally, the traffic hashing unit 22 may determine that a member link is over-utilized (e.g., exceeding a maximum utilization threshold), then traffic hashing unit 22 may skip the mapping of the over-utilized link to decrease the utilization of the over-utilized link.

As indicated above, median values of nodes of the binary tree of the set of normalized utilization values are mapped to nodes of the binary tree of the net weights of links 18. Once mapped, the median values are removed from the set of normalized utilization values, and traffic hashing unit 22 generates another iteration of binary trees based on the set of remaining normalized utilization values, as shown below:

$U_T' = U_T' - \{\text{Mapped-values}\}$

In some examples, traffic hashing unit 22 may remove a net weight of a member link, as shown below:

$\forall (W_i' \vdash W) \text{ if } \dfrac{\sum \text{Mapped-values}(W_i')}{\sum U_{jT}} = = \dfrac{W_i'}{\sum W_i'} \rightarrow \text{Remove } W_i' \text{ from } W'$ As one example, after a particular iteration (e.g., one of iterations 402-412 of FIG. 4) the current allocation of a particular member link (e.g., member link 18B) and the desired allocation of the member link is computed to determine whether to remove the member link from computation. In an example where member link 18B is removed, traffic hashing unit 22 may compute the current allocation (e.g., left-hand side of calculation) is the ratio of mapped utilization values (e.g., whose sum is 400) and the sum of a complete utilization value set ($U_T'$) (e.g., 1200), or 400/1200=1/3. The desired allocation (e.g., right-hand side of calculation) is the ratio of the net weight of the member link 18B (e.g., 20) and the total net weight of all member links (e.g., 60), or 20/(10+20+30)=1/3. In this example, traffic hashing unit 22 may remove the weight of member link 18B from the net weights (W') and continue mapping the remaining member links 18A and 18C.

Figure 3:
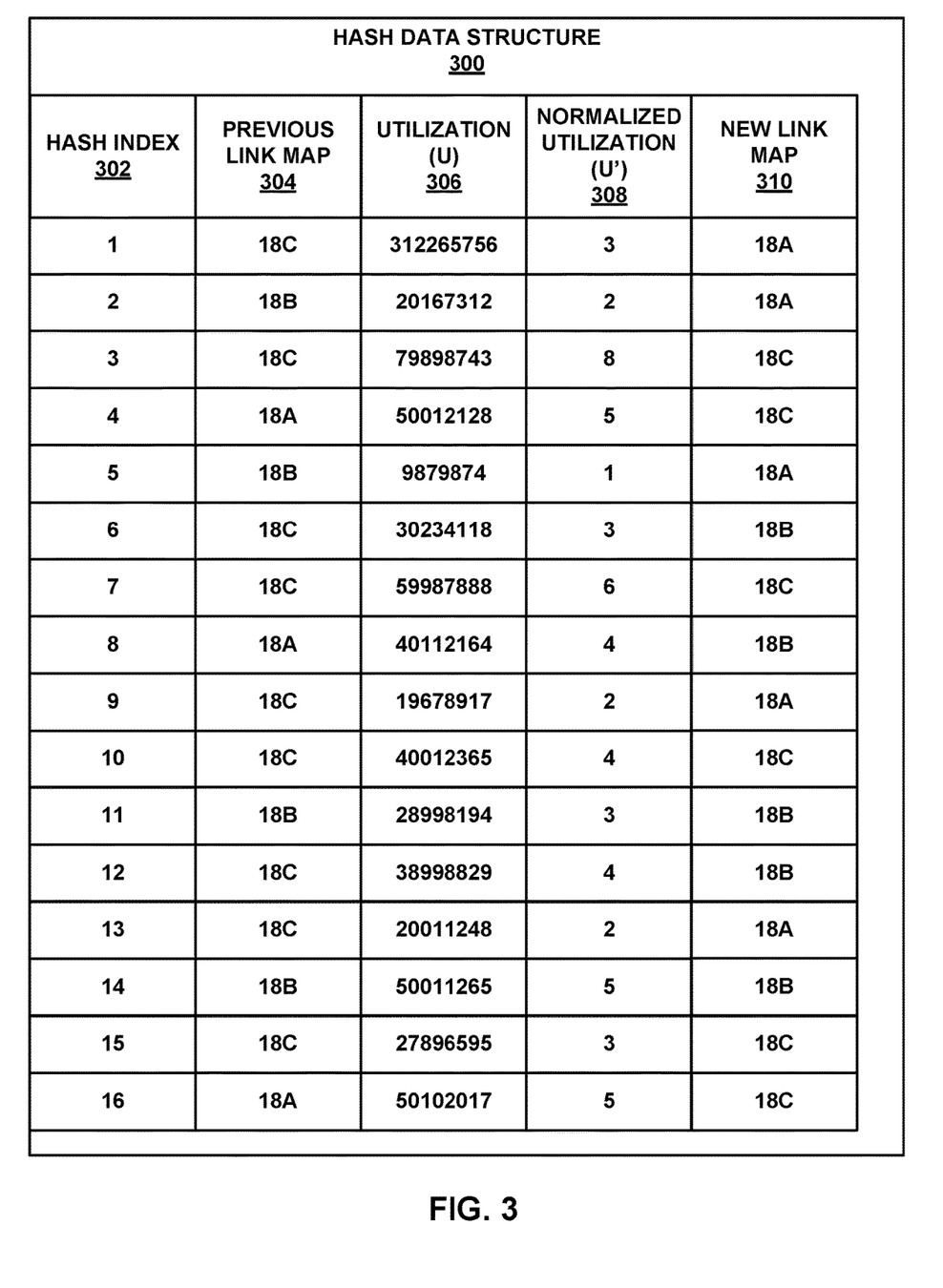
FIG. 3 is a block diagram illustrating a hash data structure, in accordance with the techniques described herein.

When all of the normalized utilization values have been mapped, traffic hashing unit 22 may update the hash data structure based on the mappings (as further illustrated in new link map column 310 of hash data structure 300 of FIG. 3). In some examples, the traffic hashing unit 22 may update the hash data structure after each mapping iteration. Although the techniques are described with respect to an aggregated interface such as a LAG, the techniques may also be used for other applications that require dynamic hash mapping, such as Equal Cost Multi-Path (ECMP), Fair Queueing (FQ), scheduling network traffic for transmission in association with egress queues, and/or any other configuration in which traffic is distributed among a plurality of links, all of which are other forms of aggregated interface as that term is used herein.

The techniques of this disclosure may provide one or more technical advantages for a practical application of traffic forwarding. For example, by using binary trees to program or re-program the hash index to member interface mapping, a network device may re-configure a hash data structure mapping to provide a proportionate dynamic allocation of the member interfaces. In this way, the network device uses the hash data structure to distribute network traffic to member interfaces for transmission in a proportionate manner, thereby reducing the occurrence of traffic being hashed to an over-utilized link and the occurrence of dropped traffic, reducing latency, and improving resource utilization. Additionally, each iteration of generating the binary trees provides regular feedback (e.g., whether links are under-utilized or over-utilized) that helps to achieve a more optimal allocation. Moreover, the techniques described herein may have a reduced computational complexity, e.g., a constant complexity that is a ratio of the number of hash-indices (M) to the number of members (N), e.g., O(M/N), rather than a complexity of O(N*N) of other hash re-distribution techniques.

Figure 2:
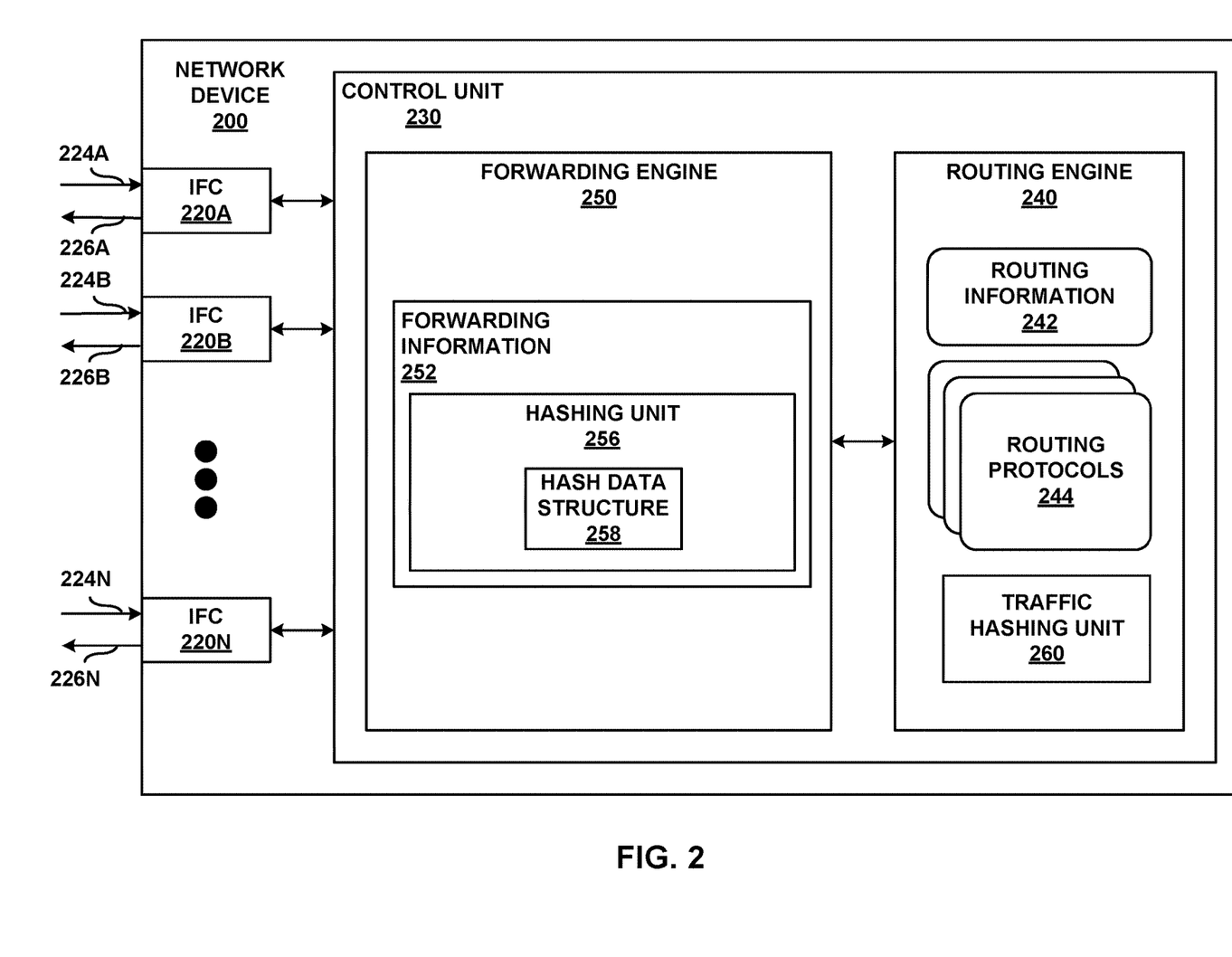
FIG. 2 is a block diagram illustrating an example network device including a hashing unit that is configured in accordance with the techniques described in this disclosure.

FIG. 2 is a block diagram illustrating an example network device including a hashing unit configured according to the techniques described in this disclosure. Network device 200 is described with respect to network device 12A of FIG. 1, but may represent any of network devices 12. Elements of FIG. 2 that are similarly named and numbered to elements of FIG. 1 conform substantially to the similarly named and numbered counterparts of FIG. 1.

In the example of FIG. 2, network device 200 includes interface cards 220A-220N (collectively, "IFCs 220") that receive packets via inbound links 224A-224N (collectively, "inbound links 224") and send packets via outbound links 226A-226N (collectively, "outbound links 226"). IFCs 220 are typically coupled to links 224 and 226 via a number of interface ports. Network device 200 also includes control unit 230 that determines routes of received packets and forwards the packets accordingly via IFCs 220.

Control unit 230 provides an operating environment for routing engine 240 and forwarding engine 250, and may be implemented solely in software, or hardware, or may be implemented as combinations of software, hardware, or firmware. For example, control unit 230 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 36 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols, processes, and modules/units. Control unit 230, in some examples, retrieves and executes the instructions from memory for these aspects.

In the example of FIG. 2, control unit 230 includes a routing engine 240 that configures and controls packet forwarding operations applied by packet forwarding engine 250. Routing engine 240 operates as a control plane for network device 12 and includes an operating system that provides a multi-tasking operating environment for execution of a number of concurrent processes. That is, routing engine 240 provides an operating environment for execution of various protocols 244 that may comprise software processes having instructions executed by a computing environment. Protocols 244 provide control plane functions for storing network topology in routing information 242, executing routing protocols to communicate with peer routing devices and maintain and update the routing tables, and providing management interface(s) to allow user access and configuration of network device 200. For example, routing protocols 244 may include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between network devices of an autonomous system and exterior gateway routing protocols are used to exchange routing information between network devices of different autonomous systems. When a network (e.g., network 10 of FIG. 1) forms an autonomous system, network devices 12 exchange routing information according to an interior gateway routing protocol. Network devices at the edge of an autonomous system (e.g., network devices 12A and 12E of FIG. 1) exchange routing information with network devices of other autonomous systems (not shown) in accordance with exterior gateway routing protocols.

In general, routing protocols 244 maintains routing information 242 in the form of routing information base (RIB) that describes a topology of a network, and derives forwarding information 252 in accordance with the routing information. In general, routing information 242 represents the overall topology of the network. Protocols 244 update routing information 242 based on routing protocol messages received by network device 200. Routing information 242 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines a network topology with interconnected links learned using a link state routing protocol (e.g., ISIS or OSFP). In contrast, forwarding information 252 is generated based on selection of certain routes within the network and maps packet key information (e.g., L2/L3 source and destination addresses) and other select information from a packet header) to one or more specific next hops forwarding structures within forwarding information 252 and ultimately to one or more specific output interface ports of IFCs 220.

In general, routing engine 240 executes routing protocols 244 to collect routing information and select routes from network device 200 to other network devices. That is, routing engine 240 provides an operating environment for one or more routing protocols that exchange messages to communicate routes and/or link information. When network device 200 receives a communication from another network device, routing engine 240 receives the communication and stores the information in routing information 242 (also referred to as a routing information base). Routing engine 240 then performs path selection to select a path from network device 200 to a destination or prefix.

Forwarding engine 250 represents hardware and logic functions that provide high-speed forwarding of network traffic. Forwarding engine 250 typically includes a set of one or more forwarding chips programmed with forwarding information, e.g., forwarding information 252, that maps network destinations with specific next hops and the corresponding output interface ports. In general, when network device 200 receives a packet via one of inbound links 224, forwarding engine 250 identifies an associated next hop for the data packet by traversing the programmed forwarding information based on information within the packet. Forwarding engine 250 forwards the packet on one of outbound links 226 mapped to the corresponding next hop.

In some examples, multiple output ports of output links 226 may reach the destination. Network device 200 may aggregate the output ports of output links 226 to form an aggregated interface or "aggregated interface bundle." To forward the packet through the aggregated interface bundle, the forwarding engine 250 may perform a hashing function of hashing unit 256. For example, forwarding engine 250 may implement the hashing function to compute a hash index from keying information from an incoming packet that is used to lookup hash data structure 258 to determine an output port of the aggregated interface bundle that is mapped to the hash index.

In accordance with the techniques described herein, network device 200 may include a traffic hashing unit 260 for dynamically mapping member interfaces of a LAG in a hash data structure. For example, traffic hashing unit 260 may program or re-program hash index to member interface mappings of hash data structure 258 based on binary trees. In some examples, traffic hashing unit 260 may represent a software module executed by routing engine 240. In other examples, traffic hashing unit 260 may be implemented in forwarding engine 250.

Traffic hashing unit 260 may determine a net weight of the member links, e.g., one or more of outbound links 226A-226N. Assume for example outbound links 226A, 226B, and 226N, are the member links of a LAG. Traffic hashing unit 260 may multiply the speed and the weight of outbound links 226A, 226B and 226N, and normalize the outcome to compute the net weight of outbound links 226A, 226B, and 226N. In some examples, traffic hashing unit 260 may store the net weights in memory within or external to network device 200.

Traffic hashing unit 260 may compute a set of normalized utilization values. For example, traffic hashing unit 260 may determine the utilization values of each mapping of outbound links 226A, 226B, and 226N and hash indices in hash data structure 258. For example, traffic hashing unit 260 may monitor interfaces of the member links based on traffic sampling or various fields in a packet header. For instance, traffic hashing unit 260 may determine the byte count within a specific time frame for each mapping of hash-indices and outbound links 226A, 226B, and 226N, respectively. Traffic hashing unit 260 may in some instances first normalize the utilization values and stores the values in hash data structure 258 (e.g., as further illustrated in normalized utilization values column 308 of hash data structure 300 of FIG. 3).

Traffic hashing unit 260 may generate binary trees (e.g., as further described and illustrated in FIG. 4 below) for the set of normalized utilization values and the net weight of outbound links 226A, 226B, and 226N. As one example, traffic hashing unit 260 may compute a net weight for links 226A, link 226B, and link 226N. In this example, traffic hashing unit 260 may generate a binary tree with the root of the tree as the rounded median value of the net weights, the left child node as the lower net weight, and the right child node as the higher net weight.

Traffic hashing unit 260 may also generate a binary tree based on the set of normalized utilization values. For example, traffic hashing unit 260 may use the set of normalized utilization values in hash data structure 258 and generate a binary tree with the root of the tree as a rounded median value of the set of normalized utilization values. Traffic hashing unit 260 may expand the binary tree to match the nodes of the binary tree of the net weights. For example, the traffic hashing unit 260 may set the left child node of the binary tree as the median value of the normalized utilization values less than the median value, and set the right child node of the binary tree as the median value of the normalized utilization values greater than the median value.

Traffic hashing unit 260 may map median values of the nodes of the binary tree of the set of normalized utilization values with the nodes of the binary tree of the net weights of member links 226A, 226B, and 226N. Once mapped, the median values are removed from the set of normalized utilization values, and traffic hashing unit 22 generates another iteration of binary trees based on the set of remaining normalized utilization values. When all the normalized utilization values have been mapped, traffic hashing unit 260 may update hash data structure 258 based on the mappings (as further illustrated in new link map column 310 of hash data structure 300 of FIG. 3). In some examples, the traffic hashing unit 260 may update hash data structure 258 after each mapping iteration.

In some instances, the traffic hashing unit 260 may determine that one or more of the links are under-utilized or over-utilized. For example, traffic hashing unit 260 may determine based on a tolerance factor, or other threshold, to determine whether the one or more of the links are under-utilized or over-utilized. In the instance that a link is under-utilized, traffic hashing unit 260 re-balance the binary trees. For example, traffic hashing unit 260 may determine that a member link is under-utilized (e.g., exceeding a minimum utilization threshold) and re-balance the binary trees by generating a binary tree that is rotated (e.g., left rotation) to shift the mapping to the under-utilized link. In the instance that a link is over-utilized, traffic hashing unit 260 may skip the allocation in a next iteration of the generation of the binary trees.

In this manner, when one of IFCs 220 receives a packet, the one of IFCs 220 passes the packet to forwarding engine 250. Forwarding engine 250 computes a hash index value from the 5-tuple of the packet, performs a lookup by querying hash data structure 258 of hashing unit 256 with the computed hash index value, and determines, from hash data structure 258, one of the member interfaces to forward the packet. Since traffic hashing unit 260 may program or re-program the hash index to member interface mappings of hash data structure 258, forwarding engine 250 may select an outbound port 226 of the aggregated interface that is not over-utilized, thereby reducing the occurrence of traffic being hashed to an over-utilized link and the occurrence of dropped traffic.

FIG. 3 is a block diagram illustrating an example of a hash data structure, in accordance with the techniques described herein. Hash data structure 300 may correspond to hash data structure 258 of FIG. 2. The hash data structure 300 of FIG. 3 is described with respect to links 18A-18C of FIG. 1. In the example of FIG. 3, hash data structure 300 includes hash indices 302, previous link map 304, utilization values 306, normalized utilization value 308, and a new link map 310. The hash data structure 300 is merely an example and may include more or less columns. For example, values of new link map 310 may replace the values of previous link map 304. In other examples, normalized utilization value 308 may be stored in memory and used for generating binary trees.

Hashing unit data structure 300 may include hash indices 302 that may function as a set of input values that are mapped to corresponding outbound interfaces to links 18. The hash indices 302 are computed from key values of packets. For example, hash indices 302 may be computed from keys of a 5-tuple packet, e.g., source IP address, destination IP address, source port, destination port, and protocol. In the example of FIG. 3, hash indices 302 includes 16 hash indices.

Previous link map 304 includes a previous mapping of member interfaces to hash indices 302. In the example of FIG. 3, member interface for link 18A is mapped to hash index 4, 8, and 16. Member interface for link 18B is mapped to hash index 2, 5, 11, and 14. Member interface for link 18C is mapped to hash index 1, 3, 6, 7, 9, 10, 12, 13, and 15.

Utilization values 306 may include utilization values of each mapping of hash indices and the member links. For example, the utilization values may include byte count, bandwidth, or other statistics. In the example of FIG. 3, each entry of the utilization values 306 is a byte count of a corresponding mapping of a hash index and a member link. For example, the mapping of hash index 1 and link 18C has a utilization value of 312265756, the mapping of hash index 2 and link 18B has a utilization value of 20167312, and so on.

The normalized utilization values 308 are the normalized value of utilization values 306. For example, traffic hashing unit 260 may normalize each entry of the utilization values 306 and store the results in normalized utilization value 308. Traffic hashing unit 260 may use the normalized utilization value 308 to generate binary trees (as further described in FIG. 4). In some examples, normalized utilization values 308 is not included in hashing data structure 300 and is instead stored in memory and used to generate the binary trees.

New link map 310 stores the mapping using binary trees. As further described in FIG. 4, network device may map values, e.g., median values, of one or more nodes of the binary trees to member interfaces, and update the hash data structure based on the mapping. In some examples, traffic hashing unit 260 may not configure the hash data structure 300 to include new link map 310 as a new column, but instead traffic hashing unit 260 may replace the previous link map 304 with the values of new link map 310.

Figure 4:
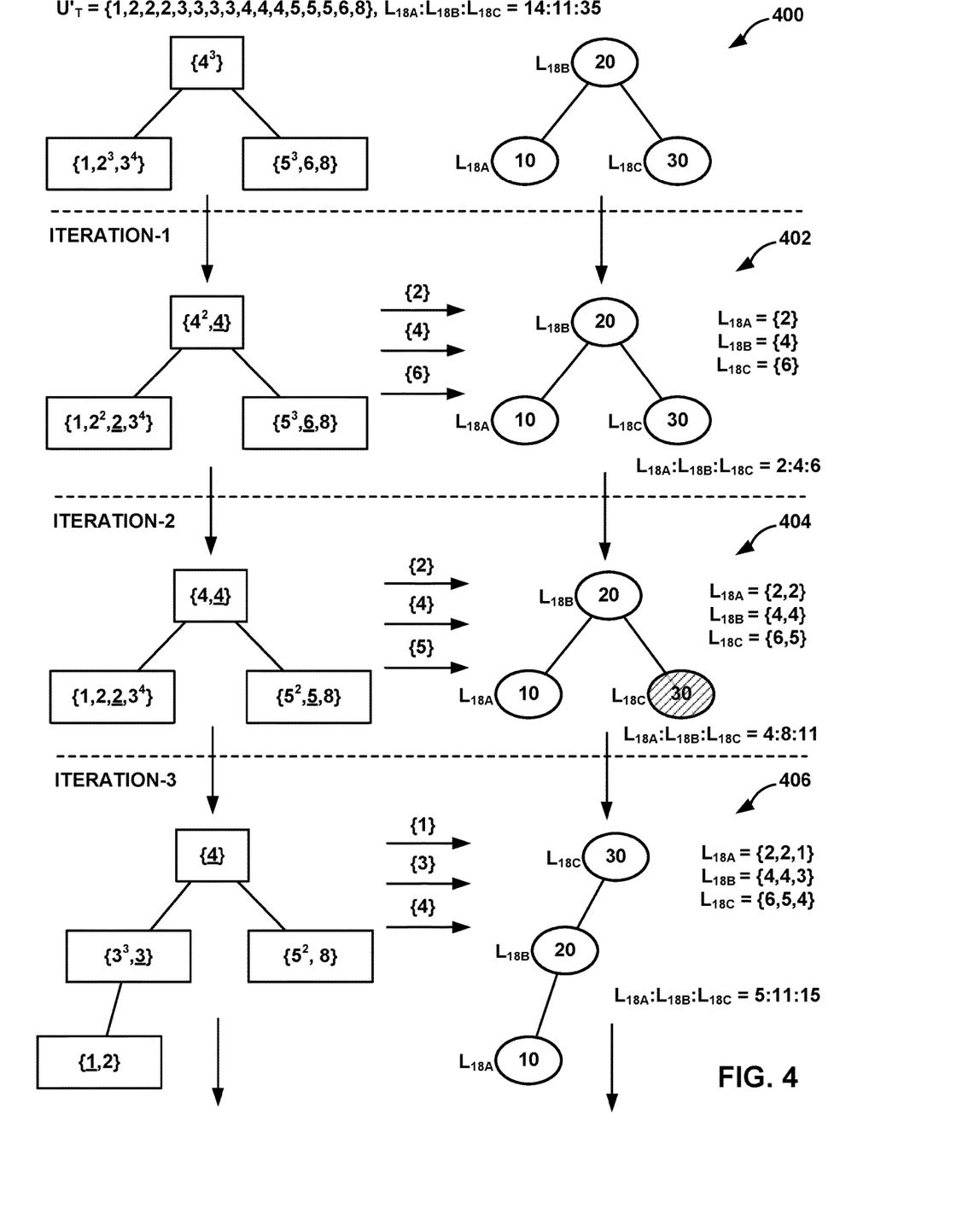
FIG. 4 is a conceptual diagram illustrating an example mapping operation based on binary trees, in accordance with the techniques described herein.

FIG. 4 is a conceptual diagram illustrating an example mapping operation based on binary trees, in accordance with the techniques described herein. The binary trees of FIG. 4 are described with respect to entries of hash data structure 300 of FIG. 3.

In the example of FIG. 4, a hashing controller unit (e.g., traffic hashing unit 260 of FIG. 2) may determine the net weight of links 18A-18C. As one example, link 18A may have a speed of 50 Mbps and a weight of 20, link 18B may have a speed of 50 and a weight of 40, and link 18C may have a speed of 100 and a weight of 30. In this example, traffic hashing unit 260 may calculate a net weight (W') of 10 for link 18A, a net weight of 20 for link 18B, and a net weight of 30 for link 18C. For the initial iteration 400, traffic hashing unit 260 may generate a binary tree, e.g., a binary search tree, with the net weights of the member links with a root as median net weight (e.g., 20) of links 18A-18C. In this example, the left child node of the binary tree is the link with net weight that is less than the net weight of 20 (e.g., Link 18A), and the right child node of the binary tree is the link with the net weight that is greater than the net weight of 20 (e.g., Link 18C).

Traffic hashing unit 260 may also compute a set of normalized utilization values (U'T) for each mapping of hash indices to member links 18, such as normalized utilization values 308 of FIG. 3. For example, traffic hashing unit 260 may compute normalized utilization values for Link 18A as $\{4,5,5\}$ for a total normalized utilization value of 14. Traffic hashing unit 260 may compute normalized utilization values for Link 18B as $\{1,2,3,5\}$ for a total normalized utilization value of 11. Traffic hashing unit 260 may also compute normalized utilization values for Link 18C as $\{2,2,3,3,3,4,4,6,8\}$ for a total normalized utilization value of 35. For ease of illustration, the mapping operation of FIG. 4 uses normalized utilization values, but in some cases the mapping operation may map utilization values that are not normalized.

Traffic hashing unit 260 take the median of all the normalized utilization values, e.g., $\{1,2,2,2,3,3,3,3,4,4,4,5,5,5,6,8\}$, of links 18A-18C, and configure the median values as the root of the binary tree. In this example, median values of the normalized utilization values are the three values of 4. As such, the initial iteration 300 of the binary tree of the set of normalized utilization values is generated with a root with the three values of 4. Traffic hashing unit 260 may expand the binary tree of the set of normalized utilization values to match the binary tree of the net weights. For example, traffic hashing unit 260 may configure the left child node of the binary tree with the normalized utilization values that are less than 4 (e.g., $\{1,2^3,3^4\}$), and the right child node of the binary tree with the normalized utilization values that are greater than 4 (e.g., $\{5^3,6,8\}$).

For the first mapping iteration 402 ("iteration 402"), Traffic hashing unit 260 may determine the median values of each node of the binary tree of the set of normalized utilization values (e.g., $\{2,4,6\}$), and map these values to the corresponding node of the binary tree of the net weights of the member links. For example, the normalized utilization value of 2 is mapped to link 18A having a net weight of 10, the normalized utilization value of 4 is mapped to link 18B having a net weight of 20, and the normalized utilization value of 6 is mapped to link 18C having a net weight of 30. As such, the total normalized utilization value for links 18A-18C is $\{2:4:6\}$, respectively. Traffic hashing unit 260 may remove the mapped normalized utilization values, e.g., $\{2,4,6\}$, from the set of normalized utilization values and generate binary trees based on the set of remaining normalized utilization values, e.g., $\{1,2^2,3^4,4^2,5^3,8\}$.

For the second iteration 404 ("iteration 404"), traffic hashing unit 260 may take the median of the set of remaining normalized utilization values, e.g., $\{1,2^2,3^4,4^2,5^3,8\}$, of links 18A-18C, and configure the median values as the root of the binary tree. In this example, median values of the set of remaining normalized utilization values are the two values of 4 and are configured as a root of the binary tree. Traffic hashing unit 260 may configure the left child node of the binary tree with the normalized utilization values that are less than 4 (e.g., $\{1,2^2,3^4\}$), and the right child node of the binary tree with the normalized utilization values that are greater than 4 (e.g., $\{5^3,8\}$).

Traffic hashing unit 260 may determine the median values of each node of the binary tree of the normalized utilization values (e.g., $\{2,4,5\}$), and map these values to the corresponding node of the binary tree of the net weights of the member links. For example, the normalized utilization value of 2 is mapped to link 18A having a net weight of 10, the normalized utilization value of 4 is mapped to link 18B having a net weight of 20, and the normalized utilization value of 5 is mapped to link 18C having a net weight of 30. As such, the total normalized utilization value for links 18A-18C after the first iteration 402 and the second iteration 404 is $\{4:8:11\}$, respectively. Traffic hashing unit 260 may remove the mapped normalized utilization values, e.g., $\{2,4,5\}$, from the set of normalized utilization values and generate binary trees based on the set of remaining normalized utilization values, e.g., $\{1,2,3^4,4,5^2,8\}$.

Following iteration 404, the traffic hashing unit 260 may determine that one or more of links 18A-18C are underutilized or over-utilized. In this example, assume for example that traffic hashing unit 260 may determine, e.g., based on a tolerance factor, that link 18C is under-utilized. In this instance, traffic hashing unit 260 may, for a third iteration 406 ("iteration 406"), re-balance the binary trees. For example, traffic hashing unit 260 may generate a rotated binary tree to shift the mapping to under-utilized link 18C. For example, traffic hashing unit 260 may rotate the binary tree of the net weights of links 18A-18C to have the root of the binary tree as link 18C. In this example, the left child node is link 18B and the second-level left child node is link 18A.

Traffic hashing unit 260 may extend the binary tree of the normalized utilization values to match the rotated binary tree of the net weights of the member links. For example, in iteration 406, traffic hashing unit 260 may take the median of all the set of remaining normalized utilization values, e.g., $\{1,2,3^4,4,5^2,8\}$, of links 18A-18C, and configure the median values as the root of the binary tree. In this example, the median value of the set of remaining normalized utilization values is 4, and is configured as a root of the binary tree. Traffic hashing unit 260 may configure a left child node of the binary tree includes the normalized utilization values that are less than 4 (e.g., {3⁴}), and the right child node of the binary tree include the normalized utilization values that are greater than 4 (e.g., {5²,8}). Traffic hashing unit 260 may extend the binary tree with second-level left child node having the normalized utilization values, e.g., {1,2}.

Traffic hashing unit 260 may determine the median values of each node of the binary tree of the normalized utilization values (e.g., {1,3,4}), and map these values to the corresponding node of the binary tree of the net weights of the member links. For example, the normalized utilization value of 1 is mapped to link 18A having a net weight of 10, the normalized utilization value of 3 is mapped to link 18B having a net weight of 20, and the normalized utilization value of 4 is mapped to link 18C having a net weight of 30. As such, the total normalized utilization value for links 18A-18C after the first iteration 402 through third iteration 406 is {5:11:15}, respectively. Traffic hashing unit 260 may remove the mapped normalized utilization values, e.g., {1,3,4}, from the set of normalized utilization values and generate binary trees based on the set of remaining normalized utilization values, e.g., {2,3³,5²,8}.

Following iteration 406, the traffic hashing unit 260 may determine that link 18C is no longer under-utilized. In this example, the binary tree of the net weights of the member links is generated without rotation. For the fourth iteration 408 ("iteration 408"), traffic hashing unit 260 may take the median of the set of remaining normalized utilization values, e.g., {2,3³,5²,8}, of links 18A-18C, and configure the median values as the root of the binary tree. In this example, median value of the set of remaining normalized utilization values is 3, and is configured as a root of the binary tree. The left child node of the binary tree includes the normalized utilization values that are less than 3 (e.g., {2}), and the right child node of the binary tree include the normalized utilization values that are greater than 3 (e.g., {5²,8}).

Traffic hashing unit 260 may determine the median values of each node of the binary tree of the normalized utilization values (e.g., {2,3,5}), and map these values to the corresponding node of the binary tree of the net weights of the member links. For example, the normalized utilization value of 2 is mapped to link 18A having a net weight of 10, the normalized utilization value of 3 is mapped to link 18B having a net weight of 20, and the normalized utilization value of 5 is mapped to link 18C having a net weight of 30. As such, the total normalized utilization value for links 18A-18C after the first iteration 402 through the fourth iteration 408 is {7:14:20}, respectively. Traffic hashing unit 260 may remove the mapped normalized utilization values, e.g., {2,3,5}, from the set of normalized utilization values and generate binary trees based on the set of remaining normalized utilization values, e.g., {3²,5,8}.

For the fifth iteration 410 ("iteration 410)"), traffic hashing unit 260 may take the median of the set of remaining normalized utilization values, e.g., {3²,5,8}, of links 18A-18C, and configure the median values as the root of the binary tree. In this example, median value of the remaining normalized utilization values is 5, and is configured as a root of the binary tree. The left child node of the binary tree includes the normalized utilization values that are less than 5 (e.g., {3,3}), and the right child node of the binary tree include the normalized utilization values that are greater than 5 (e.g., {8}).

Traffic hashing unit 260 may determine the median values of each node of the binary tree of the normalized utilization values (e.g., {3,5,8}), and map these values to the corresponding node of the binary tree of the net weights of the member links. For example, the normalized utilization value of 3 is mapped to link 18A having a net weight of 10, the normalized utilization value of 5 is mapped to link 18B having a net weight of 20, and the normalized utilization value of 8 is mapped to link 18C having a net weight of 30. As such, the total normalized utilization value for links 18A-18C after the first iteration 402 through the fifth iteration 410 is {10:19:28}, respectively. Traffic hashing unit 260 may remove the mapped normalized utilization values, e.g., {3,5,8}, from the set of normalized utilization values and generate binary trees based on the set of remaining normalized utilization values, e.g., {3}.

Following iteration 410, the traffic hashing unit 260 may determine that link 18C is under-utilized (e.g., based on a tolerance factor). In this instance, traffic hashing unit 260 may, for a sixth iteration 412 ("iteration 412"), re-balance the binary trees. For example, traffic hashing unit 260 may generate a rotated binary tree to shift the mapping to under-utilized link 18C. For example, traffic hashing unit 260 may rotate the binary tree of the net weights of links 18A-18C to have the root of the binary tree as link 18C. In this example, the left child node is link 18B and the second-level left child node is link 18A.

Since the only remaining normalized utilization value is 3, the root of the binary tree of the normalized utilization value is set to 3. Traffic hashing unit 260 may map the root of the binary tree to the corresponding root of the binary tree of the net weights of the member links. For example, the normalized utilization value of 3 is mapped to link 18C. As such, the total normalized utilization value for links 18A-18C after the first iteration 302 through the sixth iteration 312 is {10:19:31}, respectively.

With no more normalized utilization values to map, traffic hashing unit 260 may update the hash data structure based on the above mapping, as shown in new link map 310 of hash data structure 300 in FIG. 3.

In this way, the mapping operation results in a lower deviation from the desired net weight of links 18A-18C, as shown below:

| Allocation | Ratio ($L_{18A}$:$L_{18B}$:$L_{18C}$) | Deviation (in %) |
| --- | --- | --- |
| Desired | 10:20:30 | 0, 0, 0 |
| Previous | 14:11:35 | +6.7, −15, +8.3 |
| New | 10:19:31 | 0, −1.7, +1.7 |

FIG. 5 illustrates an example operation 500 to dynamically map hash indices to member interfaces of an aggregated interface, in accordance with the techniques described in this disclosure. Operation 500 may be used by a traffic hashing unit (e.g., traffic hashing unit 22 of FIG. 1) to compute binary trees, examples of which are illustrated in FIG. 4. In the example of FIG. 5, step 1 of operation 500 includes determining the net weight of each member interface of an aggregated interface. For example, the net weight (WO) is computed for a member link (i), wherein the speed of the link ($L_i$) is multiplied by the weight ($w_i$) of the member link. In some examples, the net weight ($W_i$) is normalized (W').

Step 2 of operation 500 includes determining the utilization values ($U^T$) within a specific time period of each mapping of links of a network device (e.g., byte count, bandwidth, etc.) and hash indices ($H_j$). In some examples, the utilization values ($U_T$) are normalized ($U_T'$).

Step 3 of operation 300 includes generating binary trees, such as the binary trees illustrated in FIG. 4. For example, step 3.a. includes computing a median for normalized utilization values ($U'_{Med-T}$) and a median for the normalized net weights ($W'_{Med}$). For example, in iteration 402 of FIG. 4, the median for normalized utilization values ($U'_{Med-T}$) is 4 and the median for normalized net weights (W'Med) is 20. Step 3.b. generates a binary tree having a root represented by the median calculated in step 3.a. Referring again to iteration 402 of FIG. 4, the median value, e.g., 20, for normalized net weights is set as the root of the right binary tree (step 3.b.i.) and the median value, e.g., 4, for normalized utilization values is set as the root of the left binary tree (step 3.b.ii.).

In some examples in which the binary tree is rotated (e.g., iteration 406 of FIG. 4), step 3.b.iii. expands the left binary tree to match the right binary tree that has been rotated. For example, for iteration 406 of FIG. 4, the left binary tree is expanded such that the child node "borrows" the utilization values (e.g., 1 and 2) of the left binary tree (step 3.b.iii.).

Step 3.c. of operation 500 maps the root node of the binary tree for utilization values with the root node of the binary tree for net weights. Step 3.d. of operation 500 may repeat steps 3.a.-3.c. for all levels. For example, in iteration 402 of FIG. 4, the nodes of the binary tree having nodes of the utilization values are mapped to the nodes of the binary tree for net weights. In this example, the median values (e.g., {2,4,6}) of the nodes of the left binary tree are mapped to nodes of the right binary tree (e.g., {10, 20, 30}).

Step 3.e. of operation 500 includes a re-balancing step. In step 3.e., if a member interface is under-utilized, the binary tree for the net weights is rotated to the left (step 3.e.i.). Referring again to FIG. 4, following the mapping of iteration 404, a member interface is under-utilized (e.g., Link 18C). As such, by implementing step 3.e., the binary tree for the net weights is rotated to the left such that the root is now a member interface with a larger net weight (e.g., Link 18C). Alternatively, or additionally, if a member interface is over-utilized, the mapping for a next iteration is skipped (step 3.e.ii.).

Step 3.f. of operation 500 includes adjusting the utilization values by removing the utilization values that have been mapped (step 3.f.i.). For example, following iteration 402 of FIG. 4, the mapped normalized utilization values, e.g., {2,4,6}, may be removed from the set of normalized utilization values to generate a set of remaining normalized utilization values, e.g., $\{1,2^2,3^4,4^2,5^3,8\}$.

In some examples, a net weight may be removed (step 3.f.ii.). For example, network the current allocation (e.g., left-hand side of step 3.f.ii. of FIG. 5) is compared with the desired allocation (e.g., right-hand side of step of FIG. 5). If the current allocation and desired allocation are the same, then the weight of a member link may be removed from the set of net weights (W') and the remaining member links may continue to be mapped.

Step 4 of operation 500 includes configuring a hash data structure (e.g., hash data structure 300 of FIG. 3) based on the mapping resulting from the performance of steps 1-3 as illustrated in FIG. 5.

Figure 6:
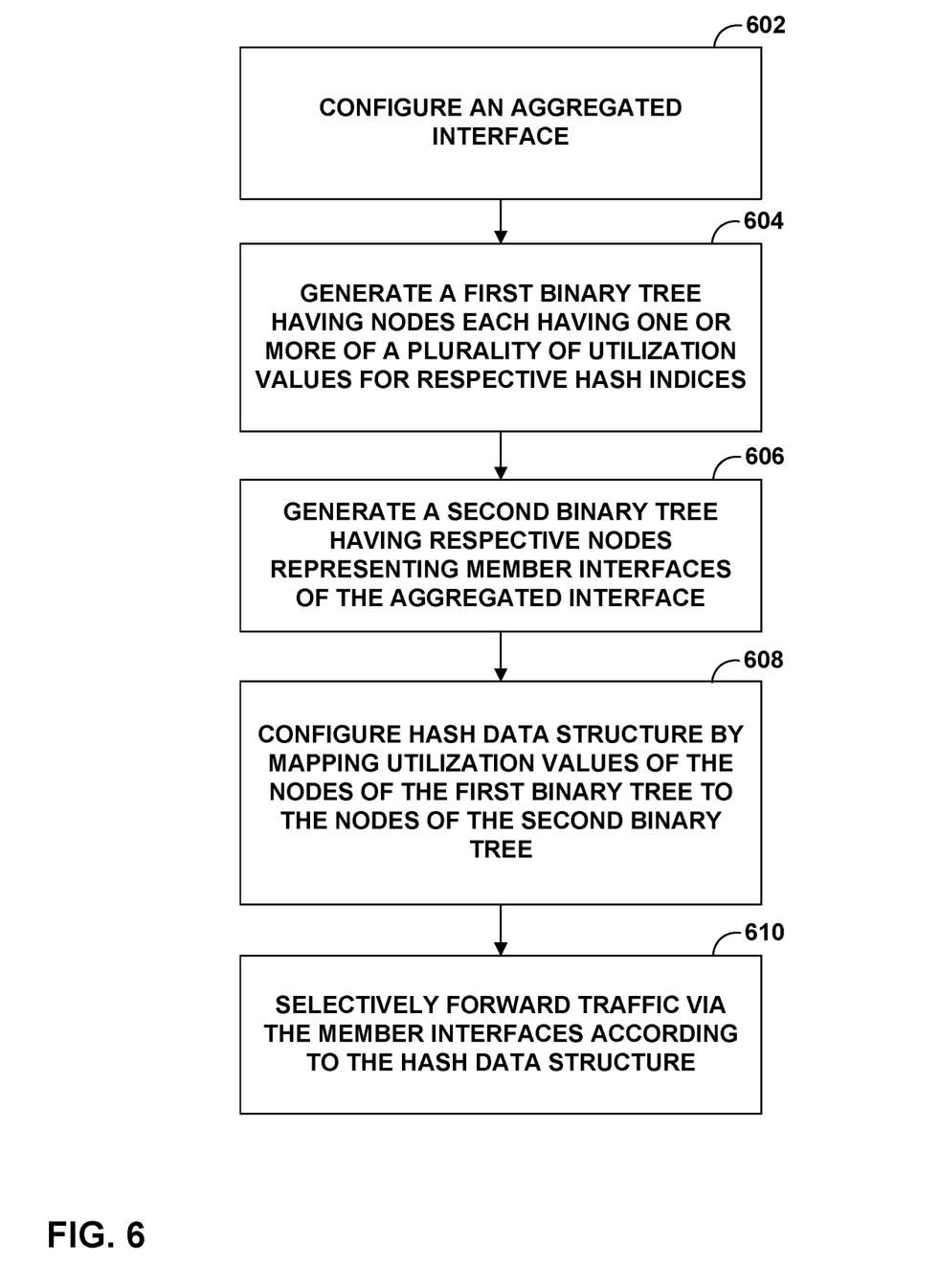
FIG. 6 is a flowchart illustrating an example operation of a network device to dynamically map hash indices to member interfaces of an aggregated interface, in accordance with the techniques described in this disclosure.

FIG. 6 is a flowchart illustrating an example operation of a network device to dynamically map hash indices to member interfaces of an aggregated interface, in accordance with the techniques described in this disclosure. FIG. 6 is described with respect to network device 12A of FIG. 1, but may be performed by any network device.

In the example of FIG. 6, network device 12A may configure an aggregated interface (602). For example, network device 12A may configure an aggregated interface comprising a plurality of member interfaces for respective member links (e.g., links 18A-18C of FIG. 1). The member links may be associated with respective net weights. Network device 12A may include a hash data structure comprising a plurality of mappings of hash index to member interfaces of the aggregated interface.

Network device 12A generates a first binary tree having nodes each having one or more of a plurality of utilization values for respective hash indices (604). For example, network device 12A may calculate a median for the utilization values and generate a binary tree with the root as the median (e.g., steps 3.a.-3.b. of FIG. 5). Network device 12A generates a second binary tree having respective nodes representing member interfaces of the aggregated interface (606). For example, network device 12A may calculate a median for the net weights and generate a binary tree with the root as the median (e.g., steps 3.a.-3.b. of FIG. 5).

Network device 12A configures the hash data structure by mapping utilization values of the nodes of the first binary tree to the nodes of the second binary tree (608). For example, network device 12A may map the root nodes of the first binary tree with the nodes of the second binary tree (e.g., steps 3.c.-3.d of FIG. 5). For example, the roots of the binary trees are mapped and the child nodes of the binary trees are mapped.

In some examples, network device 12A may determine that one or more member interfaces are under-utilized or over-utilized. In response, network device 12A may re-balance the binary trees (e.g., step 3.e. of FIG. 5). For example, network device 12A may compare the utilization values of member interfaces that are mapped to a tolerance factor or threshold to determine whether the member interfaces are under-utilized or over-utilized. If network device 12A determines that a member interface is under-utilized, network device 12A may rotate the second binary tree, e.g., to the left, such that the under-utilized member interface is the root (e.g., step 3.e.i. of FIG. 5). Alternatively, or additionally, if network device 12A determines that a member interface is over-utilized, network device 12A may map the nodes of the first binary tree to the nodes of the second binary tree except for the node representing the over-utilized member interface (e.g., step 3.e.ii. of FIG. 5).

After each mapping iteration, network device 12A may remove the mapped utilization values to generate a remaining utilization value set (e.g., steps 3.f.i. of FIG. 5). In some examples, network device 12A may remove a net weight from the net weights of the member interfaces (e.g., step 3.f.ii. of FIG. 5).

In response to mapping utilization values of the nodes of the first binary tree to the nodes of the second binary tree, network device 12A configures the hash data structure with mappings described above (e.g., step 4. of FIG. 5). Network device 12A may then selectively forward traffic via the member interfaces according to the hash data structure (610).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage median, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    configuring, by a network device, an aggregated interface comprising a plurality of member interfaces for respective member links, wherein the member links are associated with respective net weights, and wherein each of a plurality of hash indices of a hash data structure for the aggregated interface is mapped to one of the member interfaces;
    generating, by the network device, a first binary tree having nodes each having one or more of a plurality of utilization values for the respective hash indices;
    generating, by the network device, a second binary tree having respective nodes representing the member interfaces, the nodes of the second binary tree ordered by the respective net weights associated with the member interfaces for the nodes;
    configuring, by the network device, the hash data structure by mapping utilization values of the nodes of the first binary tree to the nodes of the second binary tree; and
    selectively forwarding, by the network device, traffic via the member interfaces according to the hash data structure.

2. The method of claim 1, wherein configuring the hash data structure comprises:
    assigning each hash index of the hash indices to a member interface of the member interfaces according to the mapping of the utilization value for the hash index to the node of the second binary tree that represents the member interface.

3. The method of claim 1, wherein the utilization values indicate respective amounts of traffic hashed to corresponding hash indices in a prior period of time.

4. The method of claim 1,
    wherein generating the first binary tree comprises configuring a root of the first binary tree as a median of the utilization values, and
    wherein generating the second binary tree comprises configuring a root of the second binary tree as a median of the net weights.

5. The method of claim 4,
    wherein the median of the utilization values is computed by:

$$U'_{Med-T} = \frac{\sum_{i=1}^{i=|U'|} U_{iT'}}{|U'|},$$

wherein $U_{iT}'$ is a respective normalized utilization value of the plurality of utilization values, and
    wherein the median of the net weights is computed by:

$$W'_{Med} = \frac{\sum_{i=1}^{i=|W'|} W_{i'}}{|W'|},$$

wherein $W_i'$ a respective net weight associated with the member interfaces.

6. The method of claim 1, wherein configuring the hash data structure by mapping utilization values of the nodes of the first binary tree to the nodes of the second binary tree further comprises:
    mapping, by the network device, a median value of each of the nodes of the first binary tree to the nodes of the second binary tree.

7. The method of claim 6, wherein the mapping comprises a first mapping, wherein configuring the hash data structure further comprises:
    removing, by the network device and in response to the first mapping, the utilization values that were mapped to the nodes of the second binary tree to generate remaining utilization values;
    generating, by the network device, a third binary tree having nodes each having one or more of the remaining utilization values for the respective hash indices; and
    mapping, by the network device, the nodes of the third binary tree to the nodes of the second binary tree.

8. The method of claim 1, further comprising:
    determining, by the network device and in response to the first mapping, that one of the member interfaces is under-utilized;
    rotating, by the network device, the second binary tree; and
    generating, by the network device and in response to rotating the second binary tree, one or more expanded nodes for the third binary tree to align with the nodes of the rotated second binary tree.

9. The method of claim 8, wherein determining that one of the member interfaces is under-utilized comprises comparing the mapped utilization values with a tolerance factor.

10. The method of claim 1, further comprising:
determining, by the network device and in response to the first mapping, that one of the member interfaces is over-utilized,
wherein mapping the nodes of the third binary tree to the nodes of the second binary tree comprises mapping, by the network device, utilization values of the nodes of the third binary tree to the nodes of the second binary tree without mapping a utilization value to the node of the second binary tree that represents the over-utilized member interface.

11. A network device comprising:
one or more processors;
an aggregated interface comprising a plurality of member interfaces for respective member links, wherein the member links are associated with respective net weights;
a hash data structure comprising a plurality of mappings of hash index to member interfaces of the aggregated interface, wherein the one or more processors are configured to:
generate a first binary tree having nodes each having one or more of a plurality of utilization values for the respective hash indices;
generate a second binary tree having respective nodes representing the member interfaces, the nodes of the second binary tree ordered by the respective net weights associated with the member interfaces for the nodes;
configure the hash data structure by mapping utilization values of the nodes of the first binary tree to the nodes of the second binary tree; and
selectively forward traffic via the member interfaces according to the hash data structure.

12. The network device of claim 11, wherein, to configure the hash data structure, the one or more processors are configured to:
assign each hash index of the hash indices to a member interface of the member interfaces according to the mapping of the utilization value for the hash index to the node of the second binary tree that represents the member interface.

13. The network device of claim 11, wherein the utilization values indicate respective amounts of traffic hashed to corresponding hash indices in a prior period of time.

14. The network device of claim 11,
wherein generating the first binary tree comprises configuring a root of the first binary tree as a median of the utilization values, and
wherein generating the second binary tree comprises configuring a root of the second binary tree as a median of the net weights.

15. The network device of claim 14,
wherein the median of the utilization values is computed by:

$$U'_{Med-T} = \frac{\sum_{i=1}^{i=|U'|} U_{iT'}}{|U'|},$$

wherein $U_{iT}'$ is a respective normalized utilization value of the plurality of utilization values, and
wherein the median of the net weights is computed by:

$$W'_{Med} = \frac{\sum_{i=1}^{i=|W'|} W_{i'}}{|W'|},$$

wherein $W_i'$ is a respective net weight associated with the member interfaces.

16. The network device of claim 11, wherein, to configure the hash data structure by mapping utilization values of the nodes of the first binary tree to the nodes of the second binary tree, the one or more processors are further configured to:
map a median value of each of the nodes of the first binary tree to the nodes of the second binary tree.

17. The network device of claim 16, wherein the mapping comprises a first mapping, and wherein, to configure the hash data structure, the one or more processors are further configured to:
remove, in response to the first mapping, the utilization values that were mapped to the nodes of the second binary tree to generate remaining utilization values;
generate a third binary tree having nodes each having one or more of the remaining utilization values; and
map the nodes of the third binary tree to the nodes of the second binary tree.

18. The network device of claim 17, wherein the one or more processors are further configured to:
determine, in response to the first mapping, that one of the member interfaces is under-utilized;
rotate the second binary tree; and
generate, in response to rotating that the second binary tree, one or more expanded nodes for the third binary tree to align with the nodes of the rotated second binary tree.

19. The network device of claim 17, wherein the one or more processors are further configured to:
determine, in response to the first mapping, that one of the member interfaces is over-utilized,
wherein, to map the nodes of the third binary tree to the nodes of the second binary tree, the one or more processors are configured to map utilization values of the nodes of the third binary tree to the nodes of the second binary tree without mapping a utilization value to the node of the second binary tree that represents the over-utilized member interface.

20. A non-transitory computer-readable storage medium comprising instructions that, when executed, cause a processor to:
configure an aggregated interface comprising a plurality of member interfaces for respective member links, wherein the member links are associated with respective net weights, and wherein each of a plurality of hash indices of a hash data structure for the aggregated interface is mapped to one of the member interfaces;
generate a first binary tree having nodes each having one or more of a plurality of utilization values for the respective hash indices; generate a second binary tree having respective nodes representing the member interfaces, the nodes of the second binary tree ordered by the respective net weights associated with the member interfaces for the nodes;
configure the hash data structure by mapping utilization values of the nodes of the first binary tree to the nodes of the second binary tree; and selectively forward traffic via the member interfaces according to the hash data structure.

\* \* \* \* \*